3,341,626
HOT MELT ADHESIVE COMPRISING POLYPROPYLENE AND A POLYTERPENE
Melvin E. Peterkin, Brookhaven, Pa., assignor to Sun Oil Company, Philadelphia, Pa., a corporation of New Jersey
No Drawing. Filed Mar. 10, 1965, Ser. No. 438,767
1 Claim. (Cl. 260—897)

ABSTRACT OF THE DISCLOSURE

An adhesive composition which is applied as a hot melt and will bond two materials together is prepared from three ingredients, 69 to 90 weight percent atactic polypropylene, 1 to 15 weight percent isotactic polypropylene and 1 to 18 weight percent of a polyterpene resin. A composition of 90 parts by weight of atactic polypropylene having a molecular weight of about 20,000, 10 parts by weight of isotactic polypropylene having a molecular weight of about 85,000 and 20 parts by weight of α-pinene of about 1200 molecular weight was blended at 300 to 350° F. This hot melt was used to bond kraft paper together. The bond produced gave tear seals at room temperature and at −25° F. as well as having adequate resistance to creep.

---

This invention relates to hot melt adhesive compositions. In particular, it relates to hot melt adhesive compositions having high performance properties which are prepared from low-cost materials.

Hot melt adhesives produce a bond by simple cooling as distinguished from cross-linking or other chemical reactions. Prior to heating, the adhesives are thermoplastic solid materials. Upon heating, they melt rather sharply and flow freely, and they can be remelted after cooling. The fact that hot melts are remeltable makes it possible to apply them to a substrate at one time and to remelt them and form the adhesive bond later.

Hot melt adhesives are used for bonding wood, paper, plastics, textiles and other materials. A particular use is in the fabrication of paper cartons. Hot melts for container board must have high bond strength under conditions of shock, high humidity and temperature extremes encountered in transportation and storage encountered by paper cartons. In addition, melt point, setting time, pot life and general handling qualities on corrugators and in automatic box making machinery are essential requirements.

I have found that the object of providing a high performance, low-cost, hot melt adhesive can be obtained by blending atactic polypropylene, isotactic polypropylene and a terpene resin. The compositions of the present invention have excellent properties for use in bonding materials, particularly paper. More particularly, the hot melt adhesives of the invention can be used to bond the corrugating medium to the top and bottom facer sheets in the making of corrugated paper board.

The atactic (essentially non-crystalline) polypropylene is formed during the stereospecific polymerization of polypropylene. The polymerization takes place in the presence of a catalyst comprising a coordination complex of a transition metal halide with an organometallic compound. The atactic polypropylene represents from about 5 to about 15% by weight of the polymerization product, the remainder being crystalline or isotactic polypropylene. The atactic polymer has a molecular weight of from about 15,000 to about 60,000, more particularly, from about 16,000 to about 20,000. It is soluble in boiling pentane, hexane, heptane and other hydrocarbons. The atactic polypropylene suitable for the compositions of the present invention are further characterized in that they have a Brookfield viscosity of from about 4,200 cps. to about 5,800 cps. at 300° F. and a ring and ball melt point in the range of 115° to 121° C.

In one known process, the polymerization product in the heptane reaction medium is contacted with a solvent consisting of methanol and water to kill the catalyst. The catalyst is then removed in solution leaving behind a heptane slurry. The atactic polypropylene is in solution in the heptane, and this solution is removed from the isotactic polymer. The solution is distilled to recover the heptane solvent which is recycled. The material which remains is the atactic polypropylene employed in the compositions of this invention. Suitable atactic polypropylene is commercially available such as that manufactured and sold by the Avisun Corporation under the trade name, "Oletac 100."

The isotactic polypropylene employed in the compositions of the invention may be that from which the atactic was separated in the above process and is substantially crystalline having a molecular weight of from about 80,000 to about 95,000.

The terpene resins suitable for the compositions of the instant invention include both the alpha- and the beta-pinene resins. The terpene resins are commercially available, such as "Piccolyte S–115" and "Piccolyte XA–115." Either alpha- or beta-pinene resins having a molecular weight of about 1200 and ring and ball melt point of about 115° C. are employed.

In one known procedure for producing the terpene resins, the pinene is diluted with a refined hydrocarbon solvent, such as a naphtha cut and contacted with a Friedel-Crafts catalyst. After the initial heat evolution reactions have subsided, an additional contacting period with the catalyst is provided. The catalyst is removed by successive washings with water and dilute aqueous alkali and separation of the aqueous and hydrocarbon phases. The hydrocarbon phase is then subjected to high temperature and steam distillation. The pinene resin for the present invention remains in the stillpot.

The hot melt adhesive is made by thoroughly mixing the ingredients at a temperature in the range of 200° F. to 400° F. and preferably 300° F. to 350° F.

For application to a surface, the adhesive is heated to a temperature in the range of 250° F. to 350° F. and applied to the surfaces which are to be joined in any suitable manner.

Suitable relative amounts of ingredients are from about 69 to 90 wt. percent atactic polypropylene, from about 1 to 15 wt. percent isotactic polypropylene and from about 1 to 18 wt. percent terpene resin. The preferred ranges of relative amounts of ingredients are from 70 to 78 wt. percent atactic polypropylene, from 8.5 to 15 wt. percent isotactic polypropylene and from 15 to 17 wt. percent terpene resin.

The hot melt adhesives can be accurately screened by two simple tests with kraft paper.

The first is the tear seal test. The sample is made on 50-pound kraft paper cut into 1-by-6-inch strips. One strip is coated on a single side for a length of two inches with a 1- to 2-mil coating of hot adhesive and another strip is placed over the first strip. The sample then consists of two layers of paper bonded together on internal surfaces over a two square inch area at one end. The test is made by gripping the free ends of the strips and pulling slowly in opposite directions perpendicular to the bond. A tear seal is indicated when the adhesive bond produces failure in the substrate (in this case kraft paper) at room temperature and at −25° F. The latter temperature is used to test for brittleness at the most severe low temperature service conditions the bond might be expected to encounter.

The second is the delamination test. This test is made by forming a 2-inch lap joint with two 1-by-6-inch 50-pound kraft paper strips. The sample is joined by a two square inch area of adhesive having thickness of 1 to 2 mils. The total length of the sample is 10 inches. The strip is suspended in a 150° F. oven for one-half hour. There should be no indication of the paper substrates parting in order to pass the test.

A third test, the creep test, is made on samples that pass the initial screen of the first two tests. This test is made by forming a 2-inch lap joint with two 1-by-6-inch 50-pound kraft paper strips. The sample is joined by a two square inch area of adhesive having thickness of 1 to 2 mils. The total length of the sample is 10 inches. The strip is suspended for one-half hour in an oven at the desired temperature with a 100-gram weight attached to the bottom of the lower strip. This test is designed to determine the susceptibility of the adhesive bond to deformation as a function of temperature. Stability of the bond up to 75° C. or greater is considered adequate.

The following non-limiting example describes a preferred embodiment of the invention:

Example 1

The following runs show the characteristics of the various atactic polypropylene, isotactic polypropylene and terpene resin compositions:

Properties of "Oletac 100" employed are as follows:

TABLE 1

| | |
|---|---|
| Viscosity at 300° F. (cp.) | 4,200 to 5,800 |
| Ring and Ball (°C.) | 115 to 121 |
| Molecular Weight | 16,000 to 20,000 |
| Intrinsic Viscosity (n.) | .28 |

Properties of "Piccolyte" are as follows:

TABLE II

| | Piccolyte S-115 β-Pinene resin | Piccolyte AX-115 α-Pinene resin |
|---|---|---|
| Ring and Ball Melt Point, °C. | 115 | 115 |
| Bromine No. | 3-5 | 15-20 |
| Density at 15.5° C. | 0.980 | 0.980 |
| Color Gardner Scale | 1-3 | 5-6 |
| Molecular Weight | ¹ 1,200 | ¹ 1,200 |

¹ About.

TABLE III.—OLETAC BLENDS CONTAINING PICCOLYTE S-115

| Run | Parts by Weight | | | °C., R & B | Viscosity at 300° F., cps. | Failure Creep, °C. | Tear RT | Seal, −25° F. |
|---|---|---|---|---|---|---|---|---|
| | Oletac 100 | Isotactic | Piccolyte | | | | | |
| 1 | *90 | 10 | 0 | 158 | 30,000 | 120 | Q | T |
| 2 | *90 | 10 | 2 | 156 | 28,000 | 130 | Q | T |
| 3 | *90 | 10 | 4 | 156 | 25,000 | 130 | Q | T |
| 4 | *90 | 10 | 7 | 156 | 25,000 | 130 | Q | T |
| 5 | *90 | 10 | 10 | 156 | 25,000 | 130 | Q | T |
| 6 | *90 | 10 | 15 | 155 | 21,000 | 130 | T | T |
| 7 | *90 | 10 | 20 | 156 | 21,000 | 120 | T | N |
| 8 | *90 | 20 | 20 | 154 | 27,500 | 125 | T | T |
| 9 | *90 | 10 | 20 | 156 | 21,000 | 120 | T | N |
| 10 | *90 | 5 | 20 | 153 | 9,300 | 130 | T | N |
| 11 | *90 | 3 | 20 | 152 | 7,200 | 130 | T | N |
| 12 | *90 | 0 | 20 | 114 | 4,500 | F120 | Q | N |
| 13 | *90 | 0 | 10 | 117 | 5,300 | F120 | Q | T |

*One part antioxidant added in compounding adhesive.
T = Tear seal.
Q = Questionable tear seal (tear seal when strips pulled apart at moderate speed—failure of bond; no tear seal when pulled apart slowly).
N = No tear seal.
F = Failed at.

Although the formulations of Runs 2 through 6, 8 and 10 do not possess suitable tear seals for use as hot melt adhesives for the preparation of corrugated kraft board, there are many other applications to which they would be suitable, as for example, the seal on the ends of bread wrappers where a tear seal would be undesirable.

The adhesive compositions of the present invention can contain functional materials such as plasticizers, tackifiers, fillers, solvents, thinners, antioxidants and coloring agents.

The invention claimed is:

A thermoplastic hot melt adhesive composition consisting essentially of a homogeneous mixture of from 70 to 78 wt. percent of atactic polypropylene having a moleculuar weight of 16,000 to 20,000, from 8.5 to 15 wt. percent of isotactic polypropylene having a molecular weight of 80,000 to 95,000 and from 15 to 17 wt. percent of terpene resin selected from the group consisting of alpha-pinene resin and beta-pinene resin having a molecular weight of about 1200, said adhesive being effective to bond kraft facer sheets to kraft corrugating medium in the making of corrugated paper bond.

References Cited

UNITED STATES PATENTS

| | | | |
|---|---|---|---|
| 2,772,247 | 11/1956 | Schroeder | 260—897 |
| 3,220,966 | 11/1965 | Flanagan | 260—897 |
| 3,230,186 | 1/1966 | Kreibich et al. | 260—4 |
| 3,261,820 | 7/1966 | Natta et al. | 260—93.5 |

MURRAY TILLMAN, *Primary Examiner.*

T. G. FIELD, Jr., *Assistant Examiner.*